No. 696,038. Patented Mar. 25, 1902.
E. E. GROVE.
HOSE CONNECTION.
(Application filed Dec. 20, 1901.)
(No Model.)
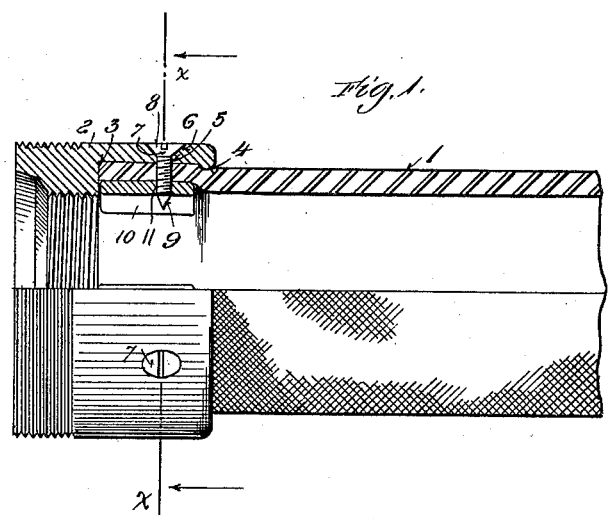
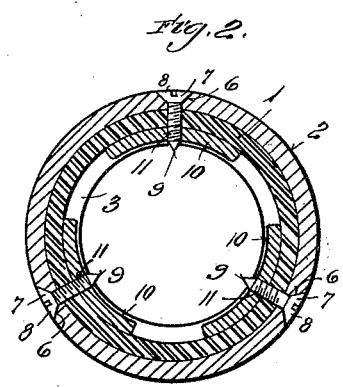
WITNESSES:
INVENTOR.
ATTORNEY.

UNITED STATES PATENT OFFICE.

ELMER E. GROVE, OF SPRINGFIELD, OHIO, ASSIGNOR TO HORATIO S. BRADLEY, HENRY F. WEINLAND, AND JAMES W. GUNN, COPARTNERS UNDER NAME OF LAGONDA MANUFACTURING COMPANY, OF SPRINGFIELD, OHIO.

HOSE CONNECTION.

SPECIFICATION forming part of Letters Patent No. 696,038, dated March 25, 1902.

Application filed December 20, 1901. Serial No. 86,695. (No model.)

*To all whom it may concern:*

Be it known that I, ELMER E. GROVE, a citizen of the United States, residing at Springfield, in the county of Clark and State of Ohio, have invented certain new and useful Improvements in Hose Connections, of which the following is a specification, reference being had therein to the accompanying drawings.

This invention relates to hose connections, or, in other words, to means for securing the end of a hose within a metallic coupling member or sleeve, and has for its object to provide a simple and efficient construction whereby such connection may be readily effected and as readily released, the joint being a tight joint and free from leakage when properly effected.

To these ends my invention consists in certain novel features, which I will now proceed to describe and will then particularly point out in the claims.

In the accompanying drawings, Figure 1 is a view, half in elevation and half in central vertical section, of a construction embodying my invention; and Fig. 2 is a transverse sectional view taken on the line $x\,x$ of Fig. 1 and looking in the direction of the arrows.

In said drawings, 1 indicates the hose, and 2 the coupling member or sleeve, which in the present instance is shown as threaded at one end in order to adapt it to be united to the other member of the coupling. This sleeve is provided internally with a shoulder 3, against which the end of the hose abuts when in position, as shown in Fig. 1. That end of the sleeve which receives the hose is provided at the margin of its mouth with an internally-projecting rib 4, preferably rounded, as shown. Between the shoulder 3 and rib 4 there is formed through the wall of the sleeve a plurality of radial apertures 5, three being shown in the present instance, said apertures being preferably countersunk at their outer ends, as indicated at 6. Through each aperture extends a screw 7, having a flaring or beveled head 8, corresponding with the countersink 6, each screw also being provided with a sharpened or pointed end 9. In connection with each aperture and screw there is employed a segmental clamping-plate 10 of a width equal to or slightly less than the distance between the shoulder 3 and rib 4, each plate being provided with a threaded aperture 11, into which the corresponding screw 7 is threaded.

In connecting the hose with the sleeve said hose is first inserted into the sleeve until its end abuts against the shoulder 3. The screws 7 are then passed through the apertures 5 and through the hose, their pointed ends materially facilitating their penetration of the hose. It will be understood, however, that this provision of pointed ends for the screws is not essential, although preferred, since apertures could be formed beforehand through the hose to permit the passage of the screws. The clamping-plates 10 are then placed in position and the screws further turned until said plates are drawn tightly against the inner wall of the hose, clamping the same effectually against the inner wall of the sleeve. The shoulder 3 not only serves as an abutment for the end of the hose, but also as a means for preventing the clamping-plates from turning along with the screws during this clamping operation, since the edges of said plates abut against the shoulder in such a manner as to prevent their turning during this operation. The tightness of the joint is materially increased by the gripping of the hose between the rib 4 and the outer edges of the clamping-plates 10. It will be seen that when the parts are assembled the hose is firmly gripped and held in position within the sleeve, forming a tight joint. It will also be seen that the connection between the hose and sleeve is readily effected and that by a reversal of the operation the two parts may be as readily disconnected.

It is obvious that various modifications in the details of construction may be made without departing from the principle of my invention. For instance, any desired number of clamping-plates and screws may be employed. Moreover, although I prefer to employ countersunk apertures in the sleeve and screws having correspondingly-beveled heads, for the reason that this gives a flush or unobstructed outer surface to the sleeve, other forms of screws may be used and the countersinks may be dispensed with. As already pointed out, the pointing of the ends of the screws, although desirable, is not absolutely necessary. Furthermore, in some cases a fairly efficient joint may be effected without the employment of the rib 4. I therefore do not wish to be understood as limiting myself strictly to the precise details of construction hereinbefore set forth, and shown in the accompanying drawings.

Having thus fully described my invention, what I claim as new, and desire to secure by Letters Patent, is—

1. A hose connection comprising a flexible hose, a sleeve within which said hose is inserted, said sleeve being provided with radial apertures, segmental clamping-plates located within the hose and having threaded apertures, and screws passing through the apertures of the sleeve and through the hose and engaging the threaded apertures of the clamping-plates, substantially as described.

2. A hose connection comprising a flexible hose, a sleeve within which said hose is inserted, said sleeve being provided with radial apertures and with an internal shoulder against which the end of the hose member may abut, segmental clamping-plates located within the hose and having threaded apertures, and screws passing through the apertures of the sleeve and through the hose and engaging the threaded apertures of the clamping-plates, the internal shoulder of the sleeve serving as a means to prevent the rotation of the clamping-plates along with the screws, substantially as described.

3. A hose connection comprising a flexible hose, a sleeve within which said hose is inserted, said sleeve being provided with radial apertures and with an internal shoulder against which the end of the hose member may abut, said sleeve being also provided at its hose-receiving mouth with an inwardly-projecting rib, segmental clamping-plates located within the hose and having threaded apertures, said clamping-plates fitting between the shoulder and rib of the sleeve, and screws passing through the apertures of the sleeve and through the hose and engaging the threaded apertures of the clamping-plates, the internal shoulder of the sleeve serving to prevent rotation of the plates along with the screws, substantially as described.

4. A hose connection comprising a flexible hose, a sleeve within which said hose is inserted, said sleeve being provided with radial apertures, segmental clamping-plates located within the hose and having threaded apertures, and screws provided with pointed or sharpened ends, said screws passing through the apertures of the sleeve and through the hose, which they are thus adapted to penetrate, and engaging the threaded apertures of the clamping-plates, substantially as described.

5. A hose connection comprising a flexible hose, a sleeve within which said hose is inserted, said sleeve being provided with radial apertures having countersunk outer ends, segmental clamping-plates located within the hose and having threaded apertures, and screws provided with beveled heads to fit the countersinks, said screws passing through the apertures of the sleeve and through the heads and engaging the threaded apertures of the clamping-plates, substantially as described.

In testimony whereof I affix my signature in presence of two witnesses.

ELMER E. GROVE.

Witnesses:
E. O. HAGAN,
F. W. SCHAEFER.